United States Patent
Kobayashi

(10) Patent No.: US 12,222,028 B2
(45) Date of Patent: Feb. 11, 2025

(54) STRAIN WAVE GEARING

(71) Applicant: HARMONIC DRIVE SYSTEMS INC., Tokyo (JP)

(72) Inventor: Masaru Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 18/573,062

(22) PCT Filed: Aug. 24, 2021

(86) PCT No.: PCT/JP2021/031054
§ 371 (c)(1),
(2) Date: Dec. 21, 2023

(87) PCT Pub. No.: WO2023/026377
PCT Pub. Date: Mar. 2, 2023

(65) Prior Publication Data
US 2024/0376972 A1    Nov. 14, 2024

(51) Int. Cl.
*F16H 49/00* (2006.01)

(52) U.S. Cl.
CPC .................. *F16H 49/001* (2013.01)

(58) Field of Classification Search
CPC .. F16H 49/001; F16H 57/02; F16H 2049/003; G01L 5/12
See application file for complete search history.

(56) References Cited

U.S. PATENT DOCUMENTS

2007/0199405 A1    8/2007   Kobayashi
2017/0009868 A1*   1/2017   Kobayashi ............. F16H 55/18

FOREIGN PATENT DOCUMENTS

| JP | 2007231996 A | 9/2007 | |
|---|---|---|---|
| JP | 6091710 B1 | 3/2017 | |
| JP | 2019105314 A | 6/2019 | |
| WO | WO-2023026488 A1 * | 3/2023 | ........... F16H 49/001 |

OTHER PUBLICATIONS

WO 2023026488 A1 (Year: 2023).*
International Search Report (PCT/ISA/210) with translation and Written Opinion (PCT/ISA/237) mailed on Oct. 5, 2021, by the Japan Patent Office as the International Searching Authority for International Application No. PCT/JP2021/031054. (9 pages).

* cited by examiner

*Primary Examiner* — Terence Boes
(74) *Attorney, Agent, or Firm* — Buchanan Ingersoll & Rooney PC

(57) ABSTRACT

In a strain wave gearing, a thrust force applied on an externally toothed gear during an increased-speed operation causes the externally toothed gear to move along an axis in a first direction, and the output-side end surface thereof is pressed, by a prescribed force, against a friction surface of a friction plate integrated with a rotating shaft part of a strain wave generator. Torque transmission efficiency can be reduced only during increased-speed operation, by means of a friction loss occurring between the externally toothed gear and the friction plate. When large load torque is applied from an output shaft which is an output-side member during reduced-speed operation, retention torque of the strain wave generator which is an input-side member during speed-reduction operation can be reduced.

4 Claims, 2 Drawing Sheets

STRAIN WAVE GEARING

TECHNICAL FIELD

The present invention relates to a "pancake-shaped" or "flat" strain wave gearing. More specifically, the present invention relates to a strain wave gearing in which a mechanism for lowering efficiency during increased-speed operation is incorporated.

BACKGROUND ART

In strain wave gearings, because internal loss torque is the same during reduced-speed operation and increased-speed operation, the torque transmission efficiency during increased-speed operation is somewhat low and is proportional to the torque transmission efficiency during reduced-speed operation. There are cases where it is desirable for strain wave gearings to have low increased-speed efficiency (low efficiency at the time of reverse input) in order to lower the total amount of electric power consumed according to operating conditions.

In Patent Document 1, the inventors propose a method that makes it possible to greatly reduce input-side retention torque that is required in order for a wave generator, which is an input-side rotating member of a cup-shaped or top-hat-shaped strain wave gearing, to be retained so as not to rotate due to load-side torque. In this method, a strain wave gearing provided with a flexible cup-shaped or top-hat-shaped externally toothed gear is configured such that input-side retention torque can be reduced using a difference between the direction of thrust acting on the wave generator during an increase in speed and that during a reduction in speed. In the strain wave gearing, thrust in a direction toward a reduced-rotation output side acts on the wave generator during a reduction in speed, and thrust in the opposite direction acts on the wave generator during an increase in speed. To give an explanation with a focus on this feature, due to the thrust acting during the reduction in speed, constituent components of the wave generator are moved and pressed against a motor housing or other fixed member, and frictional force generated thereby is used to restrain the wave generator so as not to rotate. As a result, it is possible to lower the input-side retention torque that is required in order for the wave generator, or a motor shaft or other input-side rotating shaft linked to the wave generator, to be retained so as not to rotate due to output-side torque (load-side torque). Because no frictional force is generated during the reduction in speed, efficiency does not decrease due to frictional force.

"Pancake-shaped" or "flat" strain wave gearings are also known. Strain wave gearings of such configuration comprise two internally toothed gears, a cylindrical flexible externally toothed gear that is coaxially disposed inside the internally toothed gears, and a wave generator that is coaxially mounted inside the externally toothed gear. One of the internally toothed gears is a fixed-side (stationary-side) gear that has a different number of teeth than the externally toothed gear, and the other internally toothed gear is an output-side (drive-side) gear that has the same number of teeth as the externally toothed gear and rotates integrally therewith. During reduced-speed operation, if high-speed rotation is inputted from a motor or the like to the wave generator, the rotation of the wave generator is greatly reduced in accordance with the difference between the number of teeth of the fixed-side internally toothed gear and that of the externally toothed gear, and the externally toothed gear rotates at a reduced rate. The reduced rotation is outputted from the output-side internally toothed gear, which rotates integrally with the externally toothed gear, to a load side. Conversely, during increased-speed operation, input rotation from the output-side internally toothed gear is greatly increased between the externally toothed gear and the fixed-side internally toothed gear, and high-speed rotation is outputted from the wave generator.

The externally toothed gear in a pancake-shaped or flat strain wave gearing differs from a cup-shaped or top-hat-shaped externally toothed gear by being directly linked to an output shaft or other member. A phenomenon referred to as "walking," in which the externally toothed gear moves in an axial direction (thrust direction), occurs due to thrust generated during reduced-speed operation or increased operation. A restricting member that restricts movement of the externally toothed gear is provided in order to limit axial-direction movement of the externally toothed gear to a permitted movable range. In the flexible-meshing gearing (strain wave gearing) disclosed in Patent Document 2, restricting members are disposed on both sides of an externally toothed gear, and axial-direction movement of the externally toothed gear is limited.

PRIOR-ART DOCUMENT

Patent Document

Patent Document 1: JP 2007-231996 A
Patent Document 2: JP 2019-105314 A

SUMMARY OF THE INVENTION

Problems to be Solved by the Invention

In pancake-shaped or flat strain wave gearings as well, it is desirable to lower only increased-speed efficiency (efficiency at the time of reverse input) without lowering reduced-speed efficiency in order to lower the total amount of electric power consumed according to operating conditions. Doing so makes it possible to reduce the input-side retention torque that is required in order for the wave generator, or a motor shaft or other input-side rotating shaft linked to the wave generator, to be retained so as not to rotate due to load torque (output-side torque), even if high load torque is applied from the output side.

It is an object of the present invention to provide a pancake-shaped or flat strain wave gearing in which it is possible to lower only increased-speed efficiency (efficiency at the time of reverse input) without lowering reduced-speed efficiency, by using axial-direction movement of an externally toothed gear, in order to lower the total amount of electric power consumed according to operating conditions.

Means Used to Solve the Above-Mentioned Problems

A strain wave gearing serving as the subject of the present invention is a pancake-shaped or flat strain wave gearing comprising a first internally toothed gear and a second internally toothed gear that have differing numbers of teeth, a flexible externally toothed gear that is capable of meshing with the first and second internally toothed gears and has the same number of teeth as the second internally toothed gear, and a wave generator that causes the externally toothed gear to flex into a non-circular shape and partially mesh with each of the first and second internally toothed gears.

The strain wave gearing according to the present invention has a friction member provided with a friction surface with which the externally toothed gear, moving in a first direction, can come into contact, where the first direction is a direction extending from the first-internally-toothed-gear side toward the second-internally-toothed-gear side along an axis. The friction member is attached to a rotating shaft part of the wave generator or is formed integrally with the rotating shaft part so as to rotate integrally with the rotating shaft part and so as not to move relative to the rotating shaft part in the direction of the axis.

Effect of the Invention

Due to thrust during increased-speed operation, the externally toothed gear moves in the first direction and is pressed against the friction surface of the friction member, which is integrated with or attached to the rotating shaft part of the wave generator. Loss of friction occurring between the externally toothed gear and the friction member makes it possible to lower the torque transmission efficiency only during an increase in speed. Thus, it is possible to reduce the input-side retention torque even if high load torque is applied from the reduced-rotation output side.

MODE FOR CARRYING OUT THE INVENTION

Figure 1A:
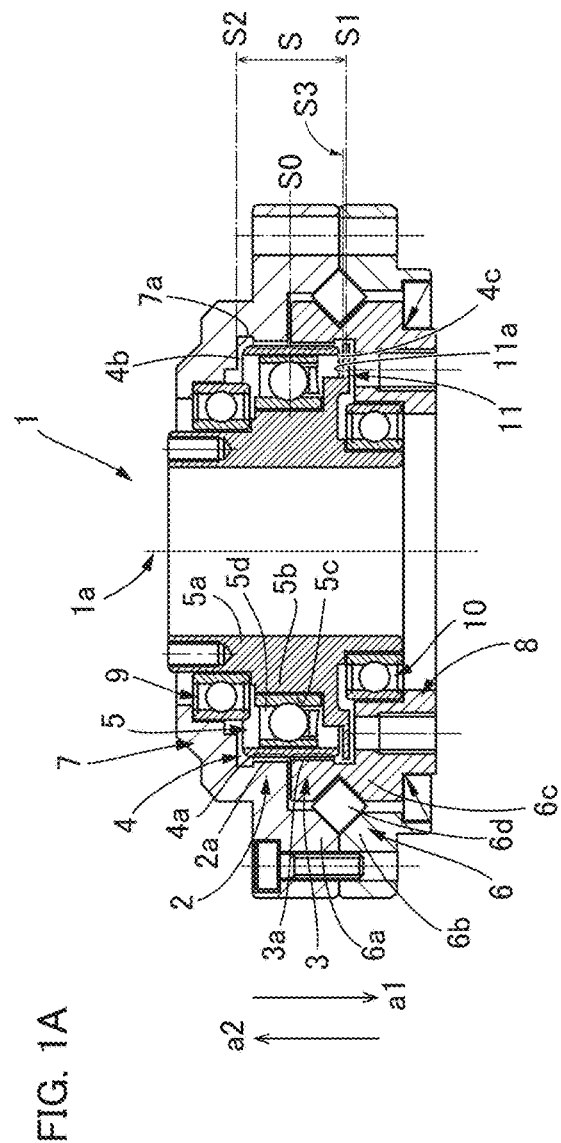
FIG. 1A is a schematic longitudinal cross-sectional view showing one example of a strain wave gearing to which the present invention is applied.
Figure 1B:
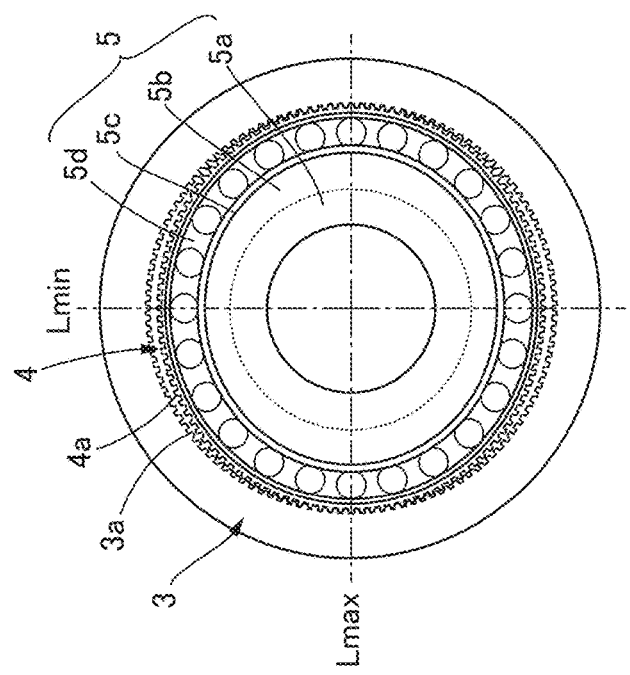
FIG. 1B is a diagram showing a state of meshing between a fixed-side internally toothed gear and an externally toothed gear that is flexed into an ellipsoidal shape.

As shown in FIGS. 1A and 1B, the basic configuration of the strain wave gearing 1 is identical to that of a typical pancake-shaped or flat strain wave gearing. The strain wave gearing 1 comprises a first internally toothed gear 2 and a second internally toothed gear 3 that are coaxially aligned in the direction of an axis 1$a$. The direction extending from the first internally toothed gear 2 toward the second internally toothed gear 3 along the axis 1$a$ is taken as a first direction 1$a$, and the direction extending from the second internally toothed gear 3 toward the first internally toothed gear 2 along the axis 1$a$ is taken as a second direction a2. A cylindrical flexible externally toothed gear 4 is coaxially disposed inside the first and second internally toothed gears 2, 3. The externally toothed gear 4 is capable of flexing in a radial direction, and external teeth 4$a$ of the externally toothed gear 4 are capable of meshing with both first internal teeth 2$a$ of the first internally toothed gear 2 and second internal teeth 3$a$ of the second internally toothed gear 3. A wave generator 5 is coaxially mounted inside the externally toothed gear 4. The wave generator 5 causes the externally toothed gear 4 to flex in the radial direction and partially mesh with each of the first and second internally toothed gears 2, 3. In the present example, the wave generator 5 is formed to have an ellipsoidal contour, the wave generator 5 causing the externally toothed gear 4 to flex into an ellipsoidal shape and causing the external teeth 4$a$ of the externally toothed gear 4 that are positioned at both end portions on a long axis Lmax of the ellipsoidal shape to mesh with each of the first internal teeth 2$a$ of the first internally toothed gear 2 and the second internal teeth 3$a$ of the second internally toothed gear 3.

The first internally toothed gear 2 is a fixed-side (or stationary-side) internally toothed gear, the first internally toothed gear 2 being fixed to a fixed-side member (not shown) of a device housing or the like. The first internally toothed gear 2 has a different number of teeth than the externally toothed gear 4. In the present example, the first internally toothed gear 2 has at least 2$n$ more teeth than the externally toothed gear 4 (where n is a positive integer), ordinarily two more. In contrast, the second internally toothed gear 3 is a reduced-rotation-output-side (drive-side) internally toothed gear, the second internally toothed gear 3 having the same number of teeth as the externally toothed gear 4.

The fixed-side first internally toothed gear 2 and the output-side second internally toothed gear 3 are supported by a main bearing 6 (a cross roller bearing) in a manner that allows relative rotation. The main bearing 6 is an outer-race separated-type bearing provided with separated outer-race elements 6$a$, 6$b$, an inner race 6$c$, and a plurality of rollers 6$d$ that are mounted between the separated outer-race elements and the inner race. The separated outer-race element 6$a$ positioned on the side of the first internally toothed gear 2 is formed integrally with the first internally toothed gear 2, and the inner race 6$c$ is formed integrally with the second internally toothed gear 3. Furthermore, an annular end plate 7 is also formed integrally with the first internally toothed gear 2. An annular reduced-rotation output shaft 8 is formed integrally with the second internally toothed gear 3 together with the inner race 6$c$.

The wave generator 5 is provided with a hollow rotating shaft part 5$a$ to which rotation is inputted from a motor or the like, an ellipsoidally contoured wave generator plug 5$b$ that is formed integrally with the outer peripheral surface of the rotating shaft part 5$a$, and a wave generator bearing 5$d$ that is mounted on an ellipsoidal outer peripheral surface 5$c$ of the wave generator plug 5$b$. A shaft end section of the rotating shaft part 5$a$ on the side of the second direction a2 is rotatably supported by the end plate 7 via a bearing 9. The opposite-side shaft end section of the rotating shaft part 5$a$ is rotatably supported by the output shaft 8 via a bearing 10.

In the present example, an end surface of the externally toothed gear 4 on the side of the second direction a2 is referred to as an input-side end surface 4$b$, and an end surface of the externally toothed gear 4 on the side of the first direction a1 is referred to as an output-side end surface 4$c$. The input-side end surface 4$b$ of the externally toothed gear 4 faces an annular inner-side end surface 7$a$ of the end plate 7 across a prescribed space. The inner-side end surface 7$a$ is orthogonal to the axis 1$a$. In contrast, the output-side end surface 4$c$ of the externally toothed gear 4 faces a friction surface 11$a$ of a friction plate 11 (friction member) across a prescribed space, the friction plate 11 being formed integrally with the rotating shaft part 5$a$ of the wave generator 5.

A permitted movable range of the externally toothed gear 4 in the direction of the axis 1$a$ is referred to as a movable range S. If the externally toothed gear 4 were to move beyond the movable range S, a suitable meshing state with the first and second internally toothed gears 2, 3 could not be maintained. The movable range S extends from a first position S1 in the first direction a1 to a second position S2 in the second direction a2. At an initial position, the tooth-trace-direction center of the externally toothed gear 4 is located at a neutral position S0, which is an intermediate position between the first and second positions S1, S2. The neutral position so is ordinarily the support center (ball center) of the wave generator bearing 5d. The friction surface 11a of the friction plate 11 is disposed at a position S3 that is closer to the neutral position so than is the first position S1. In contrast, the inner-side end surface 7a of the end plate 7 is disposed at the second position S2.

The friction plate 11 is a disc-shaped plate that extends radially outward from the outer peripheral surface of the rotating shaft part 5a. The friction surface 11a, which is formed on one end surface of the friction plate 11, is large enough to encompass the output-side end surface 4c of the externally toothed gear 4. Specifically, the outside diameter of the friction surface 11a is equal to or greater than the outside diameter of the long axis Lmax of the output-side end surface 4c of the ellipsoidally flexed externally toothed gear 4, and the inside diameter of the friction surface 11a is equal to or less than the inside diameter of a short axis Lmin of the output-side end surface 4c. The material of the friction plate 11 depends on the material of the externally toothed gear 4 (steel, stainless steel, an aluminum alloy, plastic, or the like) and is selected in consideration of wear, heat dissipation, strength, and other properties. The friction surface 11a may also be subjected to a variety of surface reformation processes.

In the present example, the friction plate 11 is formed integrally with the rotating shaft part 5a of the wave generator 5, the friction plate 11 being configured so as to rotate integrally with the rotating shaft part 5a and so as not to move relative to the rotating shaft part 5a in the direction of the axis 1a. The friction plate 11 may instead be formed as a component that is separate from the rotating shaft part 5a of the wave generator 5 and be attached to the rotating shaft part 5a or to the wave generator plug 5b so as to rotate integrally therewith and so as not to move relative thereto in the direction of the axis 1a.

Figure 2B:
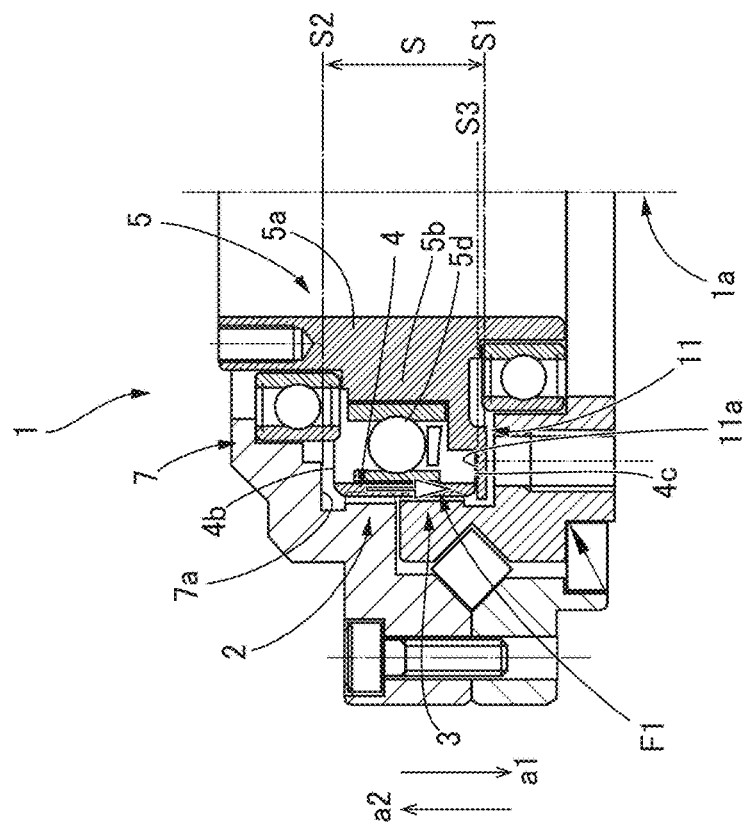
FIG. 2B is a diagram showing a state in which the externally toothed gear contacts the friction plate during increased-speed operation of the strain wave gearing.
Figure 2A:
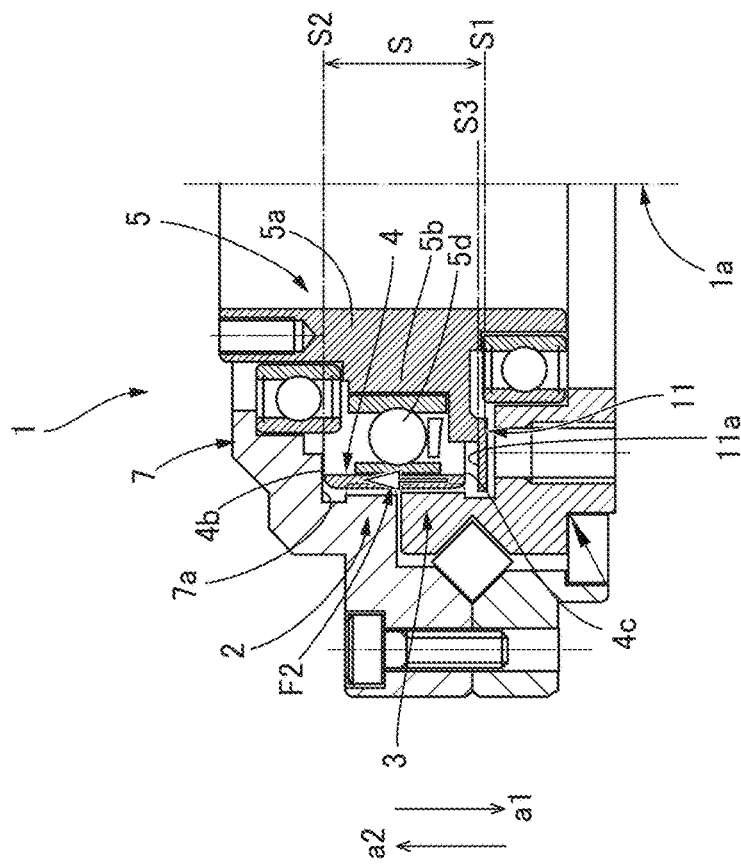
FIG. 2A is a diagram showing a state in which the externally toothed gear is separated from a friction plate during reduced-speed operation of the strain wave gearing.

FIGS. 2A and 2B illustrate movement of the externally toothed gear 4 in the direction of the axis 1a during a reduction in speed and an increase in speed of the strain wave gearing 1.

During reduced-speed operation, in which rotation is inputted from a motor or the like to the wave generator 5, greatly reduced rotation is generated in the externally toothed gear 4 in accordance with the difference between the number of teeth of the fixed-side first internally toothed gear 2 and that of the externally toothed gear 4. As shown in FIG. 2A, during reduced-speed operation, thrust F2 acts on the externally toothed gear 4 toward the second direction a2 (toward the reduced-rotation input side) along the axis 1a, as indicated by the arrow, and the externally toothed gear 4 moves in the second direction a2. Movement of the externally toothed gear 4 is limited due to the input-side end surface 4b of the externally toothed gear 4 coming into contact with the inner-side end surface 7a of the end plate 7. The inner-side end surface 7a differs from the friction surface 11a of the friction plate 11 by being, inter alia, a smooth surface having low frictional resistance. Friction loss originating from contact between the externally toothed gear 4 and the inner-side end surface 7a can substantially be disregarded. The output-side end surface 4c at the other end of the externally toothed gear 4 moves in a direction away from the friction surface 11a of the friction plate 11, and a gap between the output-side end surface 4c and the friction surface 11a increases in size. The externally toothed gear 4 does not come into frictional contact with the friction plate 11, and no friction loss occurs.

In contrast, during increased-speed operation, rotation is inputted from the output-shaft 8 side, and increased rotation is outputted from the wave generator 5. During increased-speed operation, thrust F1 acts on the externally toothed gear 4 toward the first direction a1 (toward the reduced-rotation output side) along the axis 1a, as indicated by the arrow in FIG. 2B, and the externally toothed gear 4 moves in the first direction a1. The output-side end surface 4c of the externally toothed gear 4 comes into contact with the friction surface 11a of the friction plate 11 before reaching the second position S2 at the end of the movable range S. Movement of the externally toothed gear 4 is limited, and the externally toothed gear 4 assumes a state of being pressed against the friction surface 11a. Friction loss occurring due to sliding friction between the externally toothed gear 4 and the friction plate 11 makes it possible to lower the torque transmission efficiency during an increase in speed. The input-side end surface 4b at the other end of the externally toothed gear 4 is separated from the inner-side end surface 7a of the end plate 7.

As a result of friction loss caused by the output-side end surface 4c of the externally toothed gear 4 contacting the friction plate 11, which is integrated with the rotating shaft part 5a of the wave generator 5, due to the thrust F1 during increased-speed operation, the torque transmission efficiency decreases only during an increase in speed. This makes it possible to reduce the input-side retention torque even if high load torque is applied from the output side. Specifically, it is possible to lower the input-side retention torque that is required in order for the wave generator 5, or a motor shaft or other input-side rotating shaft linked to the wave generator 5, to be retained so as not to rotate due to output-side torque (load-side torque).

The invention claimed is:
1. A strain wave gearing comprising:
a first internally toothed gear and a second internally toothed gear that have differing numbers of teeth;
a flexible externally toothed gear that is capable of meshing with the first and second internally toothed gears and has the same number of teeth as the second internally toothed gear; and
a wave generator that causes the externally toothed gear to flex into a non-circular shape and partially mesh with each of the first and second internally toothed gears,
wherein
the strain wave gearing has a friction member provided with a friction surface that is disposed at a position with which the externally toothed gear can come into contact when moving in a first direction, where the first direction is a direction extending from a side of the first internally toothed gear toward a side of the second internally toothed gear along an axis; and
the friction member is attached to a rotating shaft part of the wave generator or is formed integrally with the rotating shaft part so as to rotate integrally with the rotating shaft part and so as not to move relative to the rotating shaft part in the direction of the axis, and
wherein
the strain wave gearing has a restricting member provided with a contact surface that is disposed at a position with which the externally toothed gear can come into contact when moving in a second direction, where the second direction is a direction extending from the side of the second internally toothed gear toward the side of the first internally toothed gear along the axis, the contact surface is a surface having a frictional resistance that is lower than that of the friction surface.

2. The strain wave gearing according to claim 1, wherein the wave generator is provided with a wave generator plug that is provided with a non-circular outer peripheral surface, and a wave generator bearing that is mounted on the non-circular outer peripheral surface; and the rotating shaft part and the friction member are formed integrally with the wave generator plug.

3. The strain wave gearing according to claim 1, wherein the wave generator causes the externally toothed gear to flex into an ellipsoidal shape and mesh with the first and second internally toothed gears;

the friction surface of the friction member is an annular end surface; and an outside diameter of the friction surface is equal to or greater than a long-axis outside diameter of an end surface of the ellipsoidally flexed externally toothed gear, the end surface being located on a side that comes into contact with the friction surface, and an inside diameter of the friction surface is equal to or less than a short-axis inside diameter of the end surface.

4. The strain wave gearing according to claim 1, wherein the friction surface is disposed between a first position and a neutral position, and the contact surface is disposed at a second position, where the first position is a first-direction position for restricting a permitted movable range of the externally toothed gear in the direction of the axis, the second position is a second-direction position for the same, and the neutral position is an intermediate position between the first and second positions.

* * * * *